С
US008233944B2

(12) United States Patent
Jung et al.

(10) Patent No.: US 8,233,944 B2
(45) Date of Patent: Jul. 31, 2012

(54) SPEAKER APPARATUS AND METHOD IN A WIRELESS TELEPHONE

(75) Inventors: Jae-Ik Jung, Taegukwangyok-shi (KR); Sung-Hwae Kim, Kumi-shi (KR); Jee-Young Jung, Pusankwangyok-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 1083 days.

(21) Appl. No.: 10/843,414

(22) Filed: May 12, 2004

(65) Prior Publication Data

US 2004/0229594 A1 Nov. 18, 2004

(30) Foreign Application Priority Data

May 13, 2003 (KR) .................. 10-2003-0030124

(51) Int. Cl.
*H04M 1/00* (2006.01)
(52) U.S. Cl. ................. 455/569.1; 455/90.3; 455/550.1; 455/575.1
(58) Field of Classification Search ............... 455/569.1
See application file for complete search history.

(56) References Cited

U.S. PATENT DOCUMENTS

| 6,473,631 B1 * | 10/2002 | Siddoway et al. | 455/575.1 |
|---|---|---|---|
| 6,763,226 B1 * | 7/2004 | McZeal, Jr. | 455/90.2 |
| 7,376,447 B2 * | 5/2008 | Yoshida et al. | 455/569.1 |
| 7,447,815 B2 * | 11/2008 | Weaver et al. | 710/72 |
| 2002/0013748 A1 | 1/2002 | Edmison et al. | |
| 2002/0052222 A1 * | 5/2002 | Suzuki | 455/566 |
| 2002/0151283 A1 * | 10/2002 | Pallakoff | 455/90 |
| 2004/0023697 A1 | 2/2004 | Komura | |
| 2004/0087346 A1 * | 5/2004 | Johannsen et al. | 455/566 |
| 2004/0204194 A1 * | 10/2004 | Akai et al. | 455/575.1 |
| 2005/0245288 A1 * | 11/2005 | Priestman et al. | 455/569.1 |

FOREIGN PATENT DOCUMENTS

| JP | 8294030 A | 11/1996 |
|---|---|---|
| JP | 2002-101171 | 4/2002 |
| JP | 2002 111817 | 4/2002 |
| JP | 2002 281135 A | 9/2002 |
| JP | 2003 060757 | 2/2003 |

* cited by examiner

*Primary Examiner* — Duc Nguyen
*Assistant Examiner* — Ajibola Akinyemi
(74) *Attorney, Agent, or Firm* — Roylance, Abrams, Berdo & Goodman, LLP

(57) ABSTRACT

A method and apparatus for a wireless telephone having at least two speakers include a first speaker mounted on a folder housing of the wireless telephone; and a second speaker mounted on a body housing of the wireless telephone. The first and second speakers can be a telephone conversation speaker or a multimedia speaker, where the multimedia speaker outputs a message reception alert tone or a ringing tone. The method and apparatus further include a rotary section for rotating the folder housing, where the first or second speakers can be mounted on the rotary section.

12 Claims, 8 Drawing Sheets

SPEAKER APPARATUS AND METHOD IN A WIRELESS TELEPHONE

PRIORITY

This application claims priority under 35 U.S.C. §119 to an application entitled "Speaker Apparatus in a Wireless Telephone" filed in the Korean Intellectual Property Office on May 13, 2003 and assigned Serial No. 2003-30124, the contents of which are incorporated herein by reference.

BACKGROUND OF THE INVENTION

1. Field of the Invention

The present invention relates generally to a wireless telephone, and in particular, to a wireless telephone using at least two speakers.

2. Description of the Related Art

FIG. 1 is a block diagram illustrating an example of a conventional speaker apparatus in a wireless telephone. Referring to FIG. 1, when an input audio signal (not shown) comprises a telephone conversation signal, a control section 10 outputs the telephone conversation signal to a speaker 40 via a voice codec 21 in a data processing section 20. However, when the input audio signal is a multimedia signal, the control section 10 outputs the multimedia signal to the speaker 40 via a multimedia codec 22 in the data processing section 20. The data processing section 20 includes the voice codec 21 for processing a telephone conversation signal and the multimedia codec 22 for processing a multimedia signal comprising a message reception alert tone or a ringing tone.

In an early version of the wireless telephone, a small voice-only speaker was used to generate a buzzer tone which provided a ringing tone or a variety of reception alert tones. Since the introduction of a melody Integrated Circuit (IC), also known as a YAMA chip, a large-sized speaker capable of supporting a polyphonic sound has been widely used. Recently, a composite speaker capable of outputting both voice and a variety of signaling tones is now generally employed. However, the composite speaker is relatively larger than a normal speaker. Therefore, when mounted on the front of a main printed circuit board in a wireless telephone, the composite speaker causes the wireless telephone to be thicker due to insufficient space in the wireless telephone's front casing. In contrast, when the composite speaker is mounted on the rear of the main printed circuit board, a space for mounting the composite speaker can be sufficiently secured. In this case, however, voice is barely delivered to a speaker in the front casing of the wireless telephone, thus failing to provide a good telephone conversation environment. In addition, in order to generate a variety of sounds, a separate speaker for outputting a signaling tone which is not voice must become larger in size as the number of polyphonic levels is increased. Also, the size of a speaker mounted on an upper portion of a Liquid Crystal Display (LCD) considerably affects the total size of the wireless telephone by decreasing the portability of the wireless telephone. Moreover, a future camcoder phone will have reduced speaker mounting space as compared with an existing wireless telephone of the same size due to the camcorder phone's mechanical structure for providing a rotary function of a camcorder.

SUMMARY OF THE INVENTION

It is, therefore, an object of the present invention to provide a speaker apparatus and method capable of reducing a size of a wireless telephone that uses at least two speakers.

To substantially accomplish the above and other objects, the invention provides an apparatus and method for a wireless telephone having at least two speakers. The wireless telephone comprises a first speaker mounted on a folder housing of the wireless telephone, and a second speaker mounted on a body housing of the wireless telephone.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
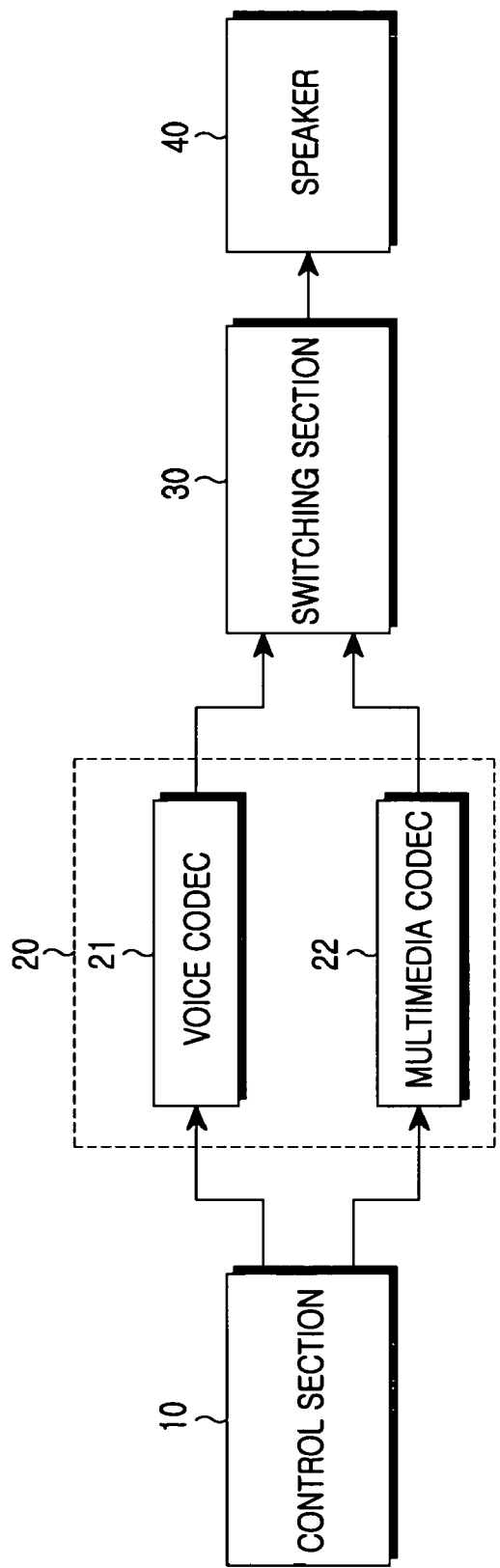
FIG. 1 is a block diagram illustrating an example of a conventional speaker apparatus in a wireless telephone.

Several embodiments of the present invention will now be described in detail with reference to the accompanying drawings. In the drawings, the same or similar elements are denoted by the same reference numerals. A detailed description of known functions and configurations incorporated herein has been omitted for conciseness.

In the following description, specific details such as the number of speakers and the positions where the speakers are mounted will be provided for a better understanding of the invention. However, it should be obvious to those skilled in the art that the invention can be implemented without the specific details mentioned or through modification thereof.

Although embodiments of the present invention will be described with reference to a wireless telephone having a rotary section capable of rotating its folder housing, the invention can also be applied to a wireless telephone not having the rotary section.

Figure 2:
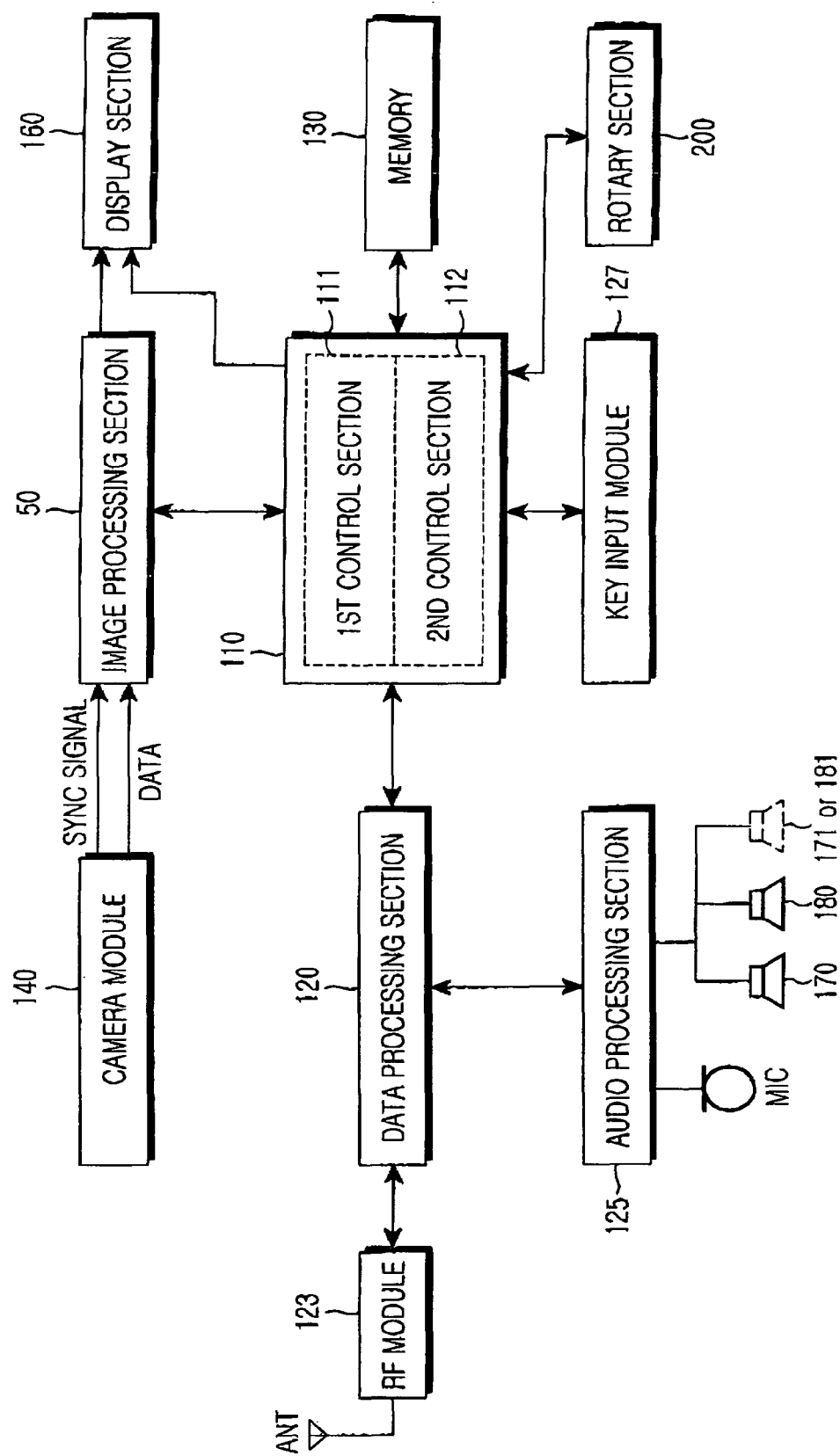
FIG. 2 is a block diagram illustrating an example of a wireless telephone according to an embodiment of the present invention.

FIG. 2 is a block diagram illustrating an example of a wireless telephone according to an embodiment of the present invention. Referring to FIG. 2, an Radio Frequency (RF) module 123 receives RF signals via performs a radio communication function for the wireless telephone. The RF module 123 includes an RF transmitter (not shown) for up-converting a frequency of a transmission signal and amplifying the up-converted transmission signal, and an RF receiver (not shown) for low-noise-amplifying a received signal and down-converting a frequency of the low-noise-amplified signal. A data processing section 120 includes a transmitter (not shown) for encoding and modulating the transmission signal, and a receiver (not shown) for demodulating and decoding the received signal. That is, the data processing section 120 can be comprised of a (modem) modulator-demodulator (modem) and a coder-decoder (codec). The codec includes a data codec (not shown) for processing packet data and an audio codec (not shown) for processing an audio signal such as voice. The audio codec can be comprised of a voice codec for processing a telephone conversation signal and a multimedia codec for processing a multimedia signal for a message reception alert tone or a ringing tone. An audio processing section 125 reproduces a received audio signal output from the audio codec in the data processing section 120 through a speaker, or delivers a transmission audio signal picked up by a microphone (MIC) to the audio codec in the data processing section 120. According to an embodiment of the present invention, the speaker can be comprised of a telephone conversation speaker 170 and a multimedia speaker 180. Alternatively, the speaker can be comprised of a first telephone conversation speaker 170, a second telephone conversation speaker 171 and the multimedia speaker 180, or the speaker can be comprised of the telephone conversation speaker 170, a first multimedia speaker 180 and a second multimedia speaker 181. The audio processing section 125 can output a multimedia signal for a message reception alert tone or a ringing tone to the multimedia speakers 180 and 181. A memory 130 can be comprised of a program memory (not shown) and a data memory (not shown). The program memory can store programs for controlling the overall operation of the wireless telephone, and control programs for outputting a received signal to a telephone conversation speaker or a multimedia speaker according to an embodiment of the present invention. The data memory temporarily stores data generated during execution of the programs. A control section 110 controls the overall operation of the wireless telephone. According to an embodiment of the present invention, the control section 110 can be comprised of a first control section 111 and a second control section 112. The first control section 111 may include the data processing section 120. The control section 110 controls the wireless telephone so that when a telephone conversation signal is received, the received telephone conversation signal is output to the telephone conversation speakers 170 and 171. Also, the control section 110 controls the wireless telephone so that when a multimedia signal for a message reception alert tone or a ringing tone is received, the received multimedia signal is output to the multimedia speakers 180 and 181.

A camera module 140 generates image data by taking a photograph of an image, and includes a camera sensor for converting an optical photographic signal to an electric signal and a signal processor for converting an analog image signal from the camera sensor into digital image data. A Charge Coupled Device (CCD) is typically used as the camera sensor, and the signal processor can be realized with a digital signal processor (DSP). The camera sensor and the signal processor can be practiced together or separately. An image processing section 150 generates display data for displaying the image signal output from the camera module 140. The image processing section 150 processes the image signal output from the camera module 140 by the frame, and outputs the image frame data in accordance with the characteristic and size of a display section 160. In addition, the image processing section 150 includes an image codec for compressing image frame data to be displayed on the display section 160 in a predetermined method and decompressing the compressed image frame data into its original image frame data. The image codec includes a Joint Photographic coding Experts Group (JPEG) codec, a Motion Picture Experts Group 4 (MPEG4) codec, and a Wavelet codec. The image processing section 150 is assumed to have an On Screen Display (OSD) function, and can output OSD data according to a size of a displayed screen under the control of the control section 110. The display section 160 displays an image signal output from the image processing section 150 onto its screen, and also displays user data output from the control section 110. An Liquid Crystal Display (LCD) is used herein as the display section 160. In an embodiment of the present invention, the display section 160 can include an LCD controller, a memory capable of storing image data, and an LCD element. When a touch screen-type LCD is used as the display section 160, the LCD can also serve as a data input module. However, in another embodiment of the present invention a key input module 127 can be used to input data. The key input module 127 has alphanumeric keys for inputting numeric and text information, and function keys for setting various functions. A rotary section 200 couples a folder housing of the wireless telephone to a body housing of the wireless telephone so that the folder housing can rotate 360° or about 360°.

An operation of the wireless telephone will now be described with reference to FIG. 2. If a user dials and then sets a call origination mode through the key input module 127, the control section 110 processes received dial information by the data processing section 120, and then converts the processed dial information into an RF signal by the RF module 123. Thereafter, if the other party (i.e., called subscriber) generates a response signal, the control section 110 detects the response signal through the RF module 123 and the data processing section 120. The user then has a telephone conversation with the called party through a speech path formed by the audio signal processing section 125. In an embodiment of the present invention, the rotary section 200 has a "push to talk" function. As the rotary section 200 has the push to talk function, a user can input, upon receipt of an incoming call, a specific key of the rotary section 200 to answer the incoming call and to have a telephone conversation with the calling party, without opening a folder of the wireless telephone.

In a call termination mode, the control section 110 detects a call termination mode through the data processing section 120, and generates a ring signal through the audio processing section 125. Thereafter, if the user responds to the ring signal, the control section 110 forms a speech path by the audio processing section 125 and the user has a telephone conversation with the other party (i.e., calling subscriber). Although the call origination mode and the call termination mode have been described with reference to voice communication, they can also be applied to data communication for packet data and image data. In an idle mode or a text communication mode, the control section 110 displays text data processed by the data processing section 120 on the display section 160.

Figure 3:
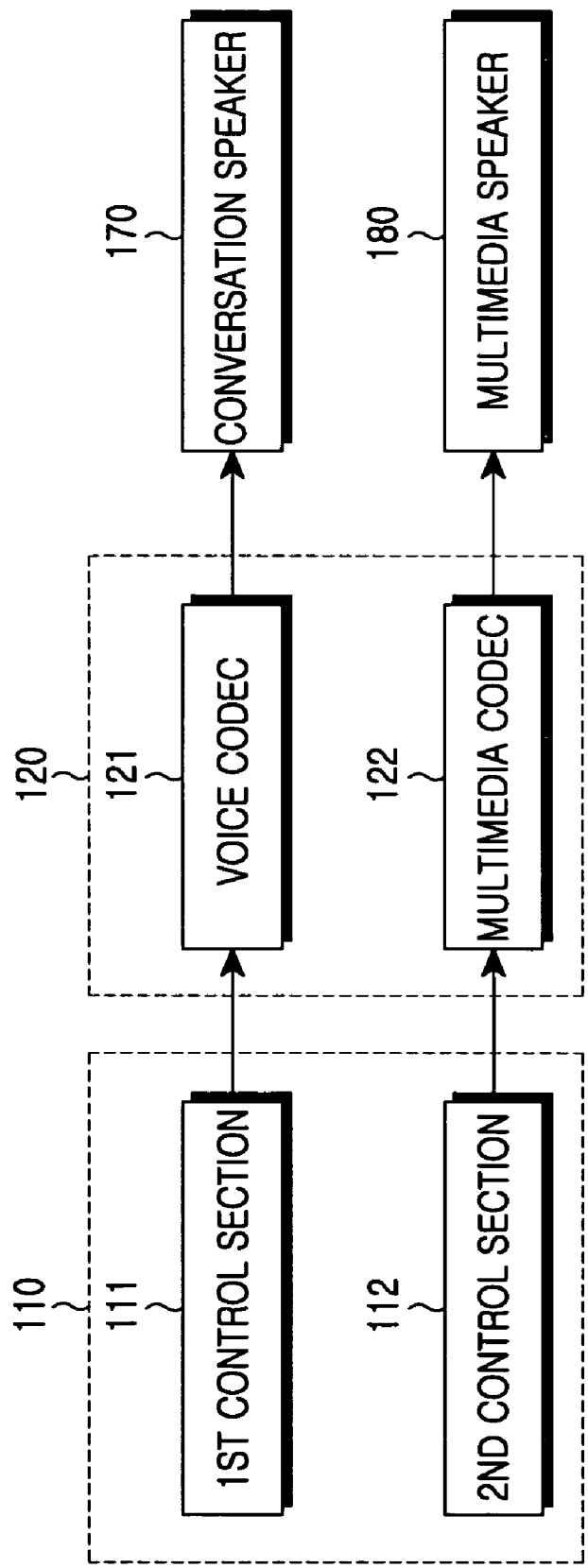
FIG. 3 is a block diagram illustrating an example of a speaker apparatus in a wireless telephone having two speakers according to an embodiment of the present invention.
Figure 5:
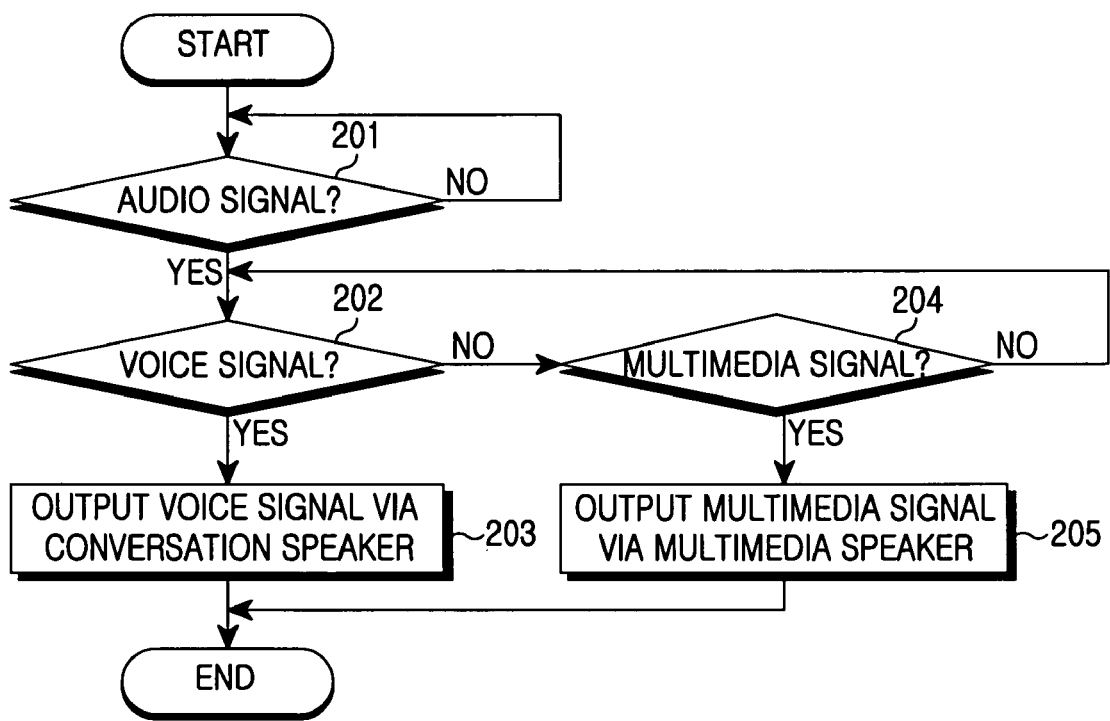
FIG. 5 is a flowchart illustrating an example of a process of outputting an audio signal in a wireless telephone according to an embodiment of the present invention.
Figure 6A:
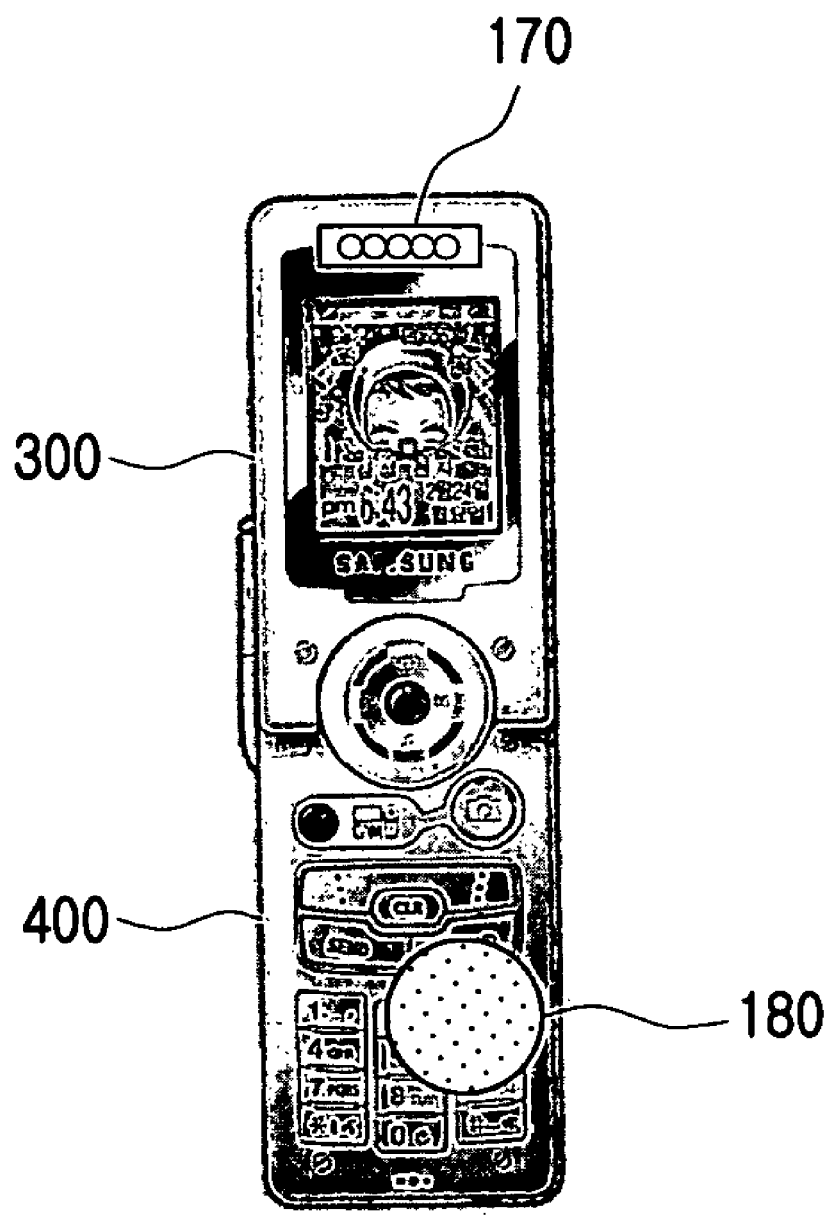
FIGS. 6A to 6C are diagrams illustrating examples of different wireless telephones in which two speakers are mounted according to an embodiment of the present invention.
Figure 6B:
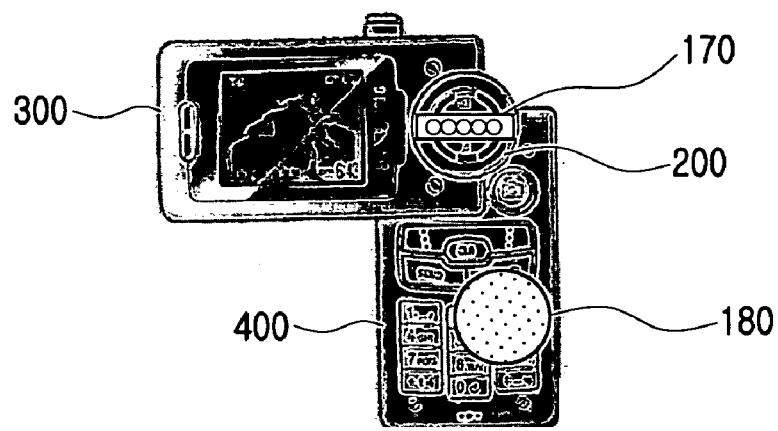
Figure 6C:
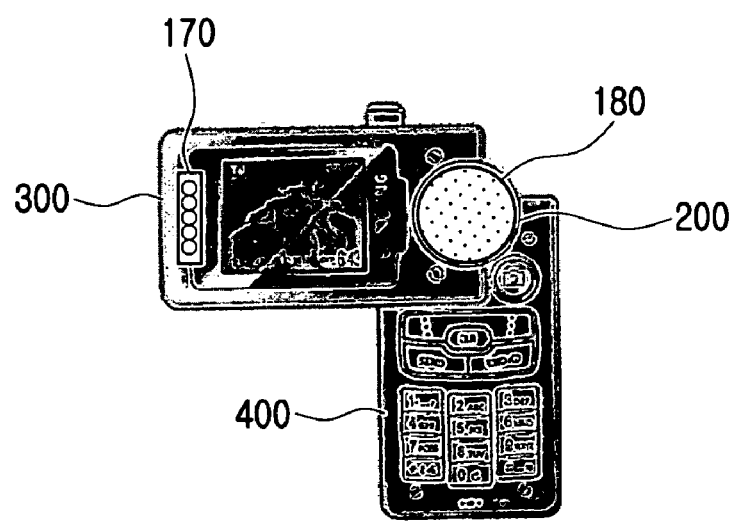

FIG. 3 is a block diagram illustrating an example of a speaker apparatus in a wireless telephone using two speakers according to an embodiment of the present invention. FIGS. 6A to 6C are diagrams illustrating examples of different wireless telephones in which two speakers are mounted according to an embodiment of the present invention. FIG. 5 is a flowchart illustrating an example of a process of outputting an audio signal in a wireless telephone according to an embodiment of the present invention.

An embodiment of the present invention will now be described in detail with reference to FIGS. 2, 3, 5, and 6A to 6C. In this embodiment of the present invention, it is assumed that the data processing section 120 includes a voice codec 121 for processing a telephone conversation signal and a multimedia codec 122 for processing a multimedia signal for a message reception alert tone or a ringing tone.

First, if an audio signal is received at a wireless telephone of FIG. 6A in which a telephone conversation speaker 170 is mounted on a folder housing 300 and a multimedia speaker 180 is mounted on a body housing 400, the control section 110 perceives reception of the audio signal in step 201 and determines whether the received signal is a voice signal or a multimedia signal for a message reception alert tone or a ringing tone. If the received signal is a voice signal, the first control section 111 perceives this in step 202 and then proceeds to step 203. In step 203, the first control section 111 controls the voice codec 121 to process the voice signal and then output the processed voice signal through the telephone conversation speaker 170 mounted on the folder housing 300. However, if the received signal is a multimedia signal, the second control section 112 perceives this in step 204 and then proceeds to step 205. In step 205, the second control section 112 controls the multimedia codec 122 to process the multimedia signal and then output the processed multimedia signal through the multimedia speaker 180 mounted on the body housing 400. For the wireless telephone of FIG. 6A, the size of the wireless telephone can be reduced by mounting the multimedia speaker 180 in the body housing 400.

Second, if an audio signal is received at the wireless telephone of FIG. 6B in which the telephone conversation speaker 170 is mounted on the rotary section 200 and the multimedia speaker 180 is mounted on the body housing 400, the control section 110 perceives reception of the audio signal in step 201 and determines whether the received signal is a voice signal or a multimedia signal for a message reception alert tone or a ringing tone. If the received signal is a voice signal, the first control section 111 perceives this in step 202 and then proceeds to step 203. In step 203, the first control section 111 controls the voice codec 121 to process the voice signal and then output the processed voice signal through the telephone conversation speaker 170 mounted on the rotary section 200. For example, the rotary section 200 has a "push to talk" function. As the rotary section 200 has the push to talk function, a user can input, upon receipt of an incoming call, a specific key of the rotary section 200 to answer the incoming call and to have a telephone conversation with the calling party, without opening a folder of the wireless telephone.

However, if the received signal is a multimedia signal, the second control section 112 perceives this in step 204 and then proceeds to step 205. In step 205, the second control section 112 controls the multimedia codec 122 to process the multimedia signal and then output the processed multimedia signal through the multimedia speaker 180 mounted on the body housing 400. For the wireless telephone of FIG. 6B, since the telephone conversation speaker 170 is mounted on the rotary section 200, a user can answer an incoming call without opening a folder of the wireless telephone. In addition, the size of the wireless telephone can be reduced by mounting the multimedia speaker 180 on the body housing 400.

Third, if an audio signal is received at a wireless telephone of FIG. 6C in which the telephone conversation speaker 170 is mounted on the folder housing 300 and the multimedia speaker 180 is mounted on the rotary section 200, the control section 110 perceives reception of the audio signal in step 201 and determines whether the received signal is a voice signal or a multimedia signal for a message reception alert tone or a ringing tone. If the received signal is a voice signal, the first control section 111 perceives this in step 202 and then proceeds to step 203. In step 203, the first control section 111 controls the voice codec 121 to process the voice signal and then output the processed voice signal through the telephone conversation speaker 170 mounted on the folder housing 300. However, if the received signal is a multimedia signal, the second control section 112 perceives this in step 204 and then proceeds to step 205. In step 205, the second control section 112 controls the multimedia codec 122 to process the multimedia signal and then output the processed multimedia signal through the multimedia speaker 180 mounted on the rotary section 200. For the wireless telephone of FIG. 6C, the size of the wireless telephone can be reduced by mounting the multimedia speaker 180 on the rotary section 200.

Figure 4:
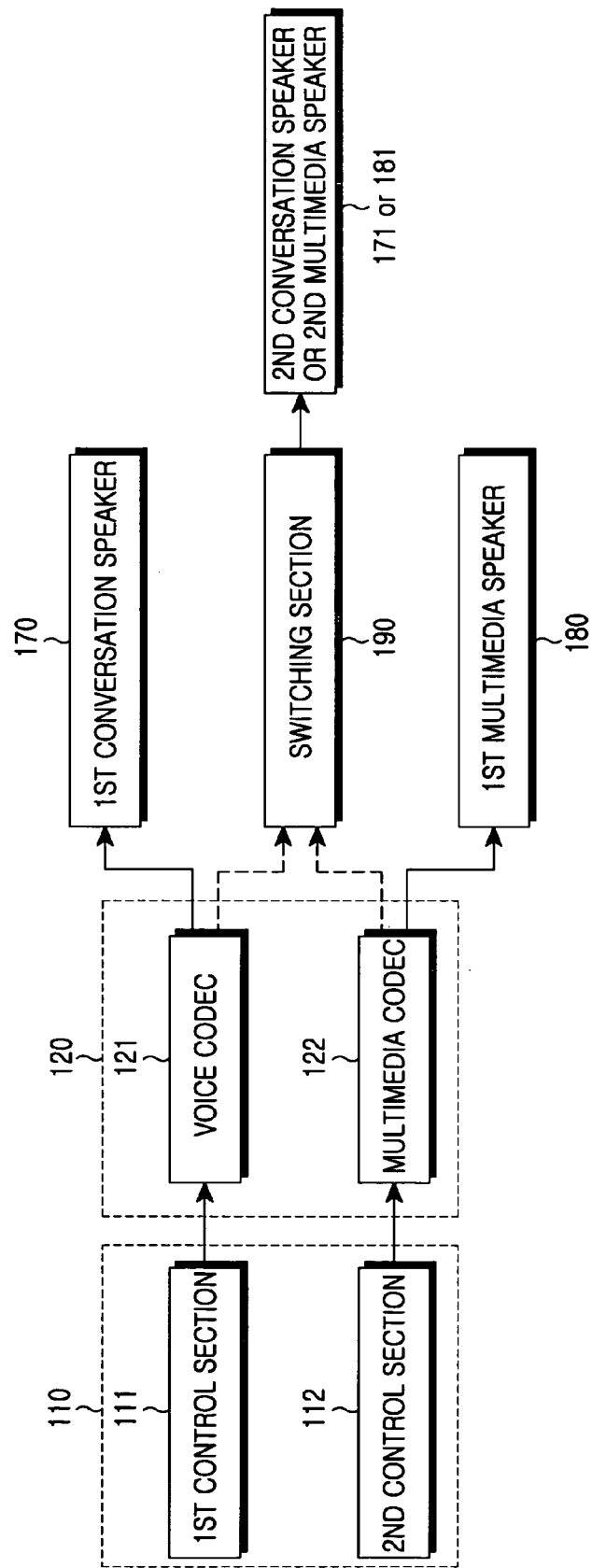
FIG. 4 is a block diagram illustrating an example of a speaker apparatus in a wireless telephone having three speakers according to another embodiment of the present invention.
Figure 6D:
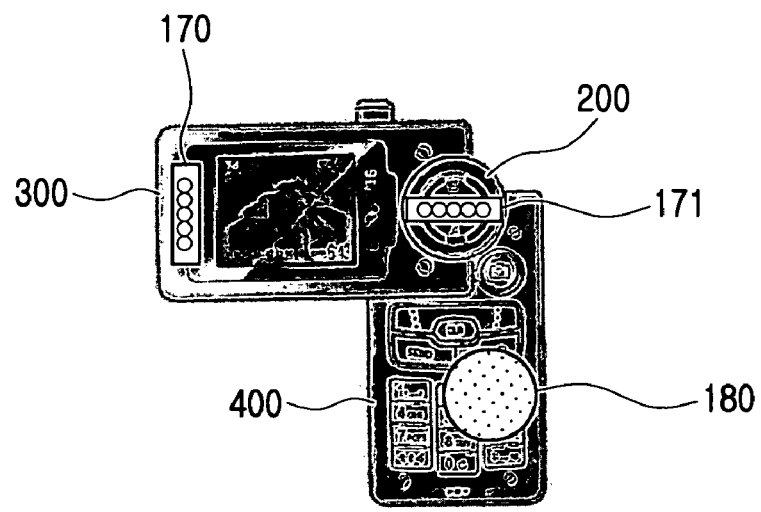
FIGS. 6D and 6E are diagrams illustrating examples of different wireless telephones in which three speakers are mounted according to an embodiment of the present invention.
Figure 6E:
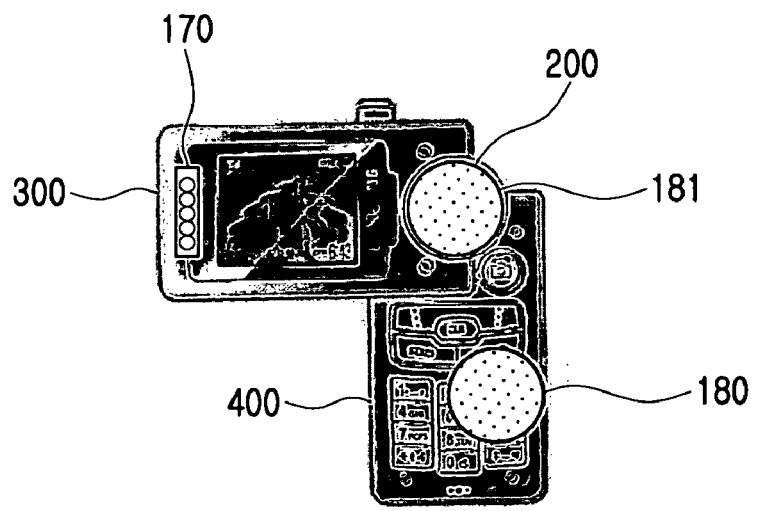

FIG. 4 is a block diagram illustrating an example of a speaker apparatus in a wireless telephone using three speakers according to another embodiment of the present invention. FIGS. 6D and 6E are diagrams illustrating examples different wireless telephones in which three speakers are mounted. FIG. 5 is a flowchart illustrating a process of outputting an audio signal in a wireless telephone according to an embodiment of the present invention.

Another embodiment of the present invention will be described in detail with reference to FIGS. 2, 4, 5, 6D and 6E. In this embodiment also, it is assumed that the data processing section 120 includes a voice codec 121 for processing a telephone conversation signal and a multimedia codec 122 for processing a multimedia signal for a message reception alert tone or a ringing tone.

First, if an audio signal is received at a wireless telephone of FIG. 6D in which a first telephone conversation speaker 170 is mounted on the folder housing 300, a second telephone conversation speaker 171 is mounted on the rotary section 200 and the multimedia speaker 180 is mounted on a body housing 400, the control section 110 perceives reception of the audio signal in step 201 and determines whether the received signal is a voice signal or a multimedia signal for a message reception alert tone or a ringing tone. If the received signal is a voice signal, the first control section 111 perceives this in step 202 and then proceeds to step 203. In step 203, the first control section 111 controls the voice codec 121 to process the voice signal and then output the processed voice signal through the first telephone conversation speaker 170 mounted on the folder housing 300. In addition, the first control section 111 controls a switching section 190 to output the processed voice signal through the second telephone conversation speaker 171 mounted on the rotary section 200. In this case, the voice signal can be output through either both the first and second telephone conversation speakers 170 and 171, or any one of them. However, if the received signal is a multimedia signal, the second control section 112 perceives this in step 204 and then proceeds to step 205. In step 205, the second control section 112 controls the multimedia codec 122 to process the multimedia signal and then output the processed multimedia signal through the multimedia speaker 180 mounted on the body housing 400. For the wireless telephone of FIG. 6D, since the telephone conversation speakers 170 and 171 are mounted on the folder housing 170 and the rotary section 200, respectively, a user can answer an incoming call without opening a folder of the wireless telephone. In addition, the size of the wireless telephone can be reduced by mounting the multimedia speaker 180 on the body housing 400.

Next, if an audio signal is received at a wireless telephone of FIG. 6E in which the telephone conversation speaker 170 is mounted on the folder housing 300, a first multimedia speaker 180 is mounted on the body housing 400 and a second multimedia speaker 181 is mounted on the rotary section 200, the control section 110 perceives reception of the audio signal in step 201 and determines whether the received signal is a voice signal or a multimedia signal for a message reception alert tone or a ringing tone. If the received signal is a voice signal, the first control section 111 perceives this in step 202 and then proceeds to step 203. In step 203, the first control section 111 controls the voice codec 121 to process the voice signal and then output the processed voice signal through the telephone conversation speaker 170 mounted on the folder housing 300. However, if the received signal is a multimedia signal, the second control section 112 perceives this in step 204 and then proceeds to step 205. In step 205, the second control section 112 controls the multimedia codec 122 to process the multimedia signal and then output the processed multimedia signal through the first multimedia speaker 180 mounted on the body housing 400. In addition, the second control section 112 controls the switching section 190 to output the processed multimedia signal through the second multimedia speaker 181 mounted on the rotary section 200. In this case, the multimedia signal can be output through either both the first and second multimedia speakers 180 and 181, or any one of them. For the wireless telephone of FIG. 6E, the user can enjoy stereo sound and the size of the wireless telephone can be reduced by mounting the multimedia speakers 180 and 181 on the body housing 400 and the rotary section 200, respectively.

The present invention has the following advantages. That is, in a wireless telephone having at least two speakers, the speakers are separately mounted to reduce the required speaker mounting space. The reduction in the speaker mounting space contributes to an increase in the size of the LCD and a decrease in the size of the wireless telephone.

While the invention has been shown and described with reference to certain embodiments thereof, it will be understood by those skilled in the art that various changes in form and details may be made therein without departing from the spirit and scope of the invention as defined by the appended claims.

What is claimed is:

1. A wireless telephone having at least two speakers, comprising:
   a first speaker mounted on a folder housing of the wireless telephone for use as a telephone conversation speaker when receiving a telephone conversation voice signal;
   a second speaker mounted on a body housing of the wireless telephone for use as a multimedia speaker when receiving a multimedia signal; and
   a control section that determines whether the received signal is a voice signal or a multimedia signal, wherein if the received signal is a voice signal, then the control section outputs a processed voice signal through the first speaker and if the received signal is a multimedia signal, then the control section outputs a processed multimedia signal through the second speaker,
   wherein the body housing comprises a portion of a rotary section located at the center of the telephone for rotating the folder housing, and the second speaker is mounted on the portion of the rotary section.

2. The wireless telephone of claim 1, wherein:
   the folder housing comprises a portion of a rotary section for rotating the folder housing, wherein the first speaker is mounted on the portion of the rotary section.

3. The wireless telephone of claim 1, wherein the rotary section comprises:
   a push to talk key for answering an incoming call and have a telephone conversation with the calling party without opening a folder of the wireless telephone.

4. The wireless telephone of claim 1, further comprising:
   a third speaker mounted on portion of a rotary section, for rotating the folder housing and the body housing.

5. The wireless telephone of claim 1, wherein the control section comprises a first control section and a second control section, wherein if the received signal is a voice signal, then the first control section outputs a processed voice signal through the first speaker, and if the received signal is a multimedia signal, then the second control section outputs a processed multimedia signal through the second speaker.

6. The wireless telephone of claim 4, wherein the third speaker comprises a multimedia speaker or a telephone conversation speaker.

7. A method of providing a wireless telephone having at least two speakers, comprising:
   mounting a first speaker for use as the telephone conversation speaker on a folder housing of the wireless telephone when receiving a telephone conversation voice signal mounting a second speaker for use as the multimedia speaker on a body housing of the wireless telephone when receiving a multimedia signal; and
   determining whether the received signal is a voice signal or multimedia signal, wherein if the received signal is a voice signal, then the control section outputs a processed voice signal through the first speaker and if the received signal is a multimedia signal, then the control section outputs a processed multimedia signal through the second speaker,
   wherein the second speaker mounting step mounts the second speaker on the rotary section located at the center of the telephone and used to rotate the body housing.

8. The method of claim 7, wherein:
   the first speaker mounting the first speaker on a rotary section is used to rotate the folder housing.

9. The method of claim 7, further comprising:
   mounting a third speaker on a rotary section, for rotating the folder housing and the body housing.

10. The method of claim 9, wherein the third speaker comprises a multimedia speaker or a telephone conversation speaker.

11. The method of claim 9, further comprising:
    answering an incoming call and having a telephone conversation with the calling party without opening a folder of the wireless telephone via a push to talk key on the rotary section.

12. A wireless telephone having at least two speakers, comprising:
    a first speaker for use as a telephone conversation speaker;
    a second speaker for use as a multimedia speaker when multimedia signal is received; and
    a control section that determines whether the received signal is a voice signal or multimedia signal, wherein if the received signal is a voice signal, then the control section outputs a processed voice signal through the first speaker and if the received signal is a multimedia signal, then the control section outputs a processed multimedia signal through the second speaker,
    wherein a body housing of the wireless telephone comprises a portion of a rotary section located at the center of telephone, for rotating a folder housing of the wireless telephone, wherein the second speaker is mounted on the portion of the rotary section.

* * * * *